Sept. 20, 1966    G. A. WINKLER    3,273,407
INDICATOR DEVICE
Filed Sept. 10, 1964    2 Sheets-Sheet 1

Inventor:
Gustav A. Winkler
By Mueller and Aichele
Attys.

Sept. 20, 1966 G. A. WINKLER 3,273,407
INDICATOR DEVICE
Filed Sept. 10, 1964 2 Sheets-Sheet 2
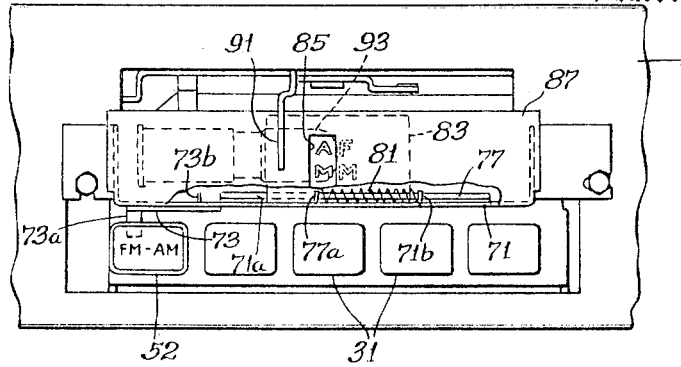
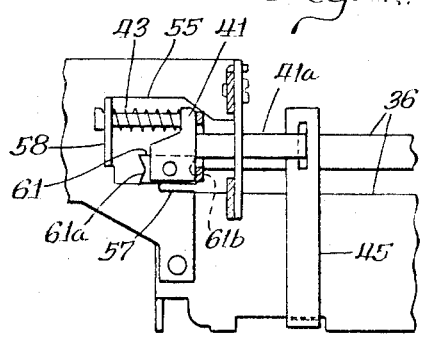 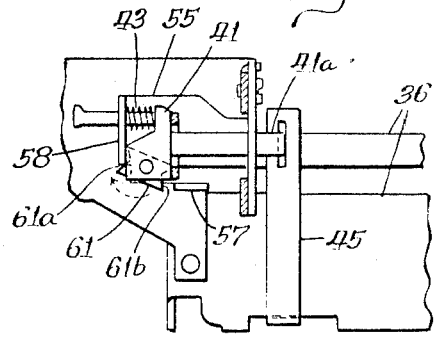
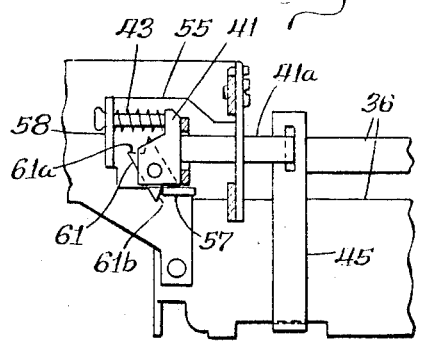 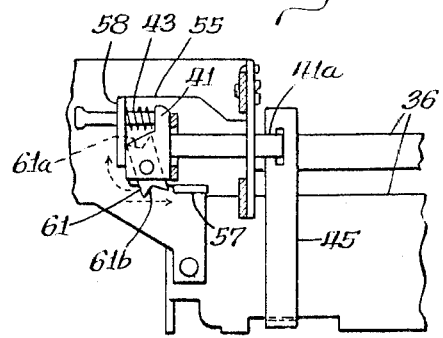
Inventor:
Gustav A. Winkler
By Mueller and Aichele
Attys.

United States Patent Office 3,273,407
Patented Sept. 20, 1966

3,273,407
INDICATOR DEVICE
Gustav A. Winkler, Wheaton, Ill., assignor to Motorola, Inc., Franklin Park, Ill., a corporation of Illinois
Filed Sept. 10, 1964, Ser. No. 395,467
6 Claims. (Cl. 74—10.27)

This invention relates to indicator devices, and more particularly to a device for indicating the operating state of apparatus which is pushbutton controlled.

In pushbutton controlled apparatus, a pushbutton may be provided for switching such apparatus between various operating states. For example, wave signal receiver apparatus may include a pushbutton which is depressible to switch the operating mode of such apparatus between ultra-high frequency and very high frequency, or between amplitude modulation and frequency modulation. It is desirable that such depression of the pushbutton also result in a visual indication of the state to which the apparatus has been switched. Provision for such an indication may present significant problems regarding cost, size, complexity and production.

Accordingly, it is an object of this invention to provide a compact low cost device for indicating the operating state of apparatus which is pushbutton controlled.

Another object of the invention is to provide a state indicator for pushbutton controlled wave signal receiving apparatus, which indicator is simple and easily produced.

Still another object of the invention is to provide an improved AM–FM indicator for use in a radio receiver having a tuner with a plurality of pushbuttons and a tuning indicator.

A feature of the invention is the provision of an indicator including a bell crank, pivoted by a control pushbutton, which crank moves a slidable member to bring indicator figures into alignment with an opening in a background plate.

Another feature of the invention is the provision, in the above indicator, of a spring biased slidable bracket fixed to the slidable member and being substantially perpendicular thereto, with the bracket engaging the bell crank to be displaced thereby.

Still another feature of the invention is the provision, in the above indicator, of a support plate with upwardly extending tabs therein for guiding the spring biased bracket, and of a coil spring connected between the bracket and one of the tabs.

In the drawings:

FIG. 3 is a front elevational view of the apparatus of FIG. 1;

FIG. 4 is a sectional view taken along the line 4—4 of FIG. 1;

FIG. 5 is an alternative position of the apparatus as viewed in FIG. 4;

FIG. 6 is a sectional view taken along the line 6—6 of FIG. 2; and,

FIG. 7 is an alternative position of the apparatus as viewed in FIG. 6.

Figure 1:
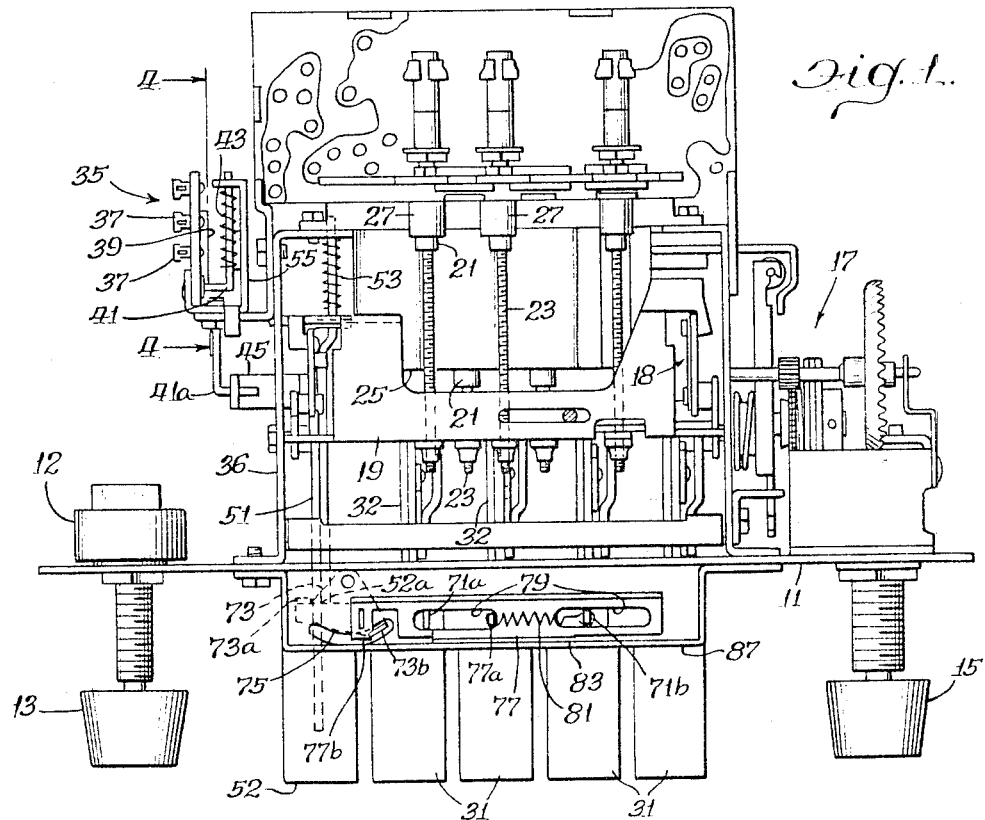
FIG. 1 is a top plan view of an AM–FM tuner for a radio receiver having an indicator device constructed in accordance with the invention.

The invention provides an indicator for use in a device operable to different states by a pushbutton having first and second stable positions. The indicator includes a plate having an opening therein. A slidable member is disposed behind the opening in the plate and has indicia thereon representing the operative states of the device. The slidable member is movable to align the appropriate indicia with the opening in the plate so that they are visible. A bell crank is engageable by the pushbutton and is pivotal to first and second positions according to the first and second positions of the pushbutton. The bell crank is coupled to the slidable plate to move the slidable plate and align the appropriate indicia with the opening in the plate according to the first and second positions of the bell crank.

The drawings show wave signal tuning apparatus for use in an AM–FM automobile radio receiver. The apparatus includes a front panel 11 for mounting behind the dash panel of the automobile. Front panel 11 carries a volume control potentiometer 12 from which extends a bushing and control shaft supporting a volume control knob 13. A similar bushing and control shaft extend from panel 11 on the other side of the apparatus and the shaft supports a tuning control knob 15. Tuning control knob 15 is rotatable to drive a gear train 17 which is coupled through a linkage 18 to a slidable tuning carriage 19, as is well known in the art.

Tuning carriage 19 is linearly slidable for tuning the apparatus. A plurality of tuning cores or slugs 21 are connected to the tuning carriage by threaded rods 23 to be positioned by the carriage. Cores 21 extend into the interior of tuning coils which are disposed in tuning coil structures 25 and 27 for the AM and FM tuning of the radio receiver, respectively. Tuning carriage 19 is also positionable by depression of a plurality of presettable pushbuttons 31. Each pushbutton 31 controls a presettable cam slide 32 associated therewith. Cam slides 32 each carry a cam which is engageable with a pair of transversely extending treadle bars to position the tuning carriage, all as is well known in the art. An example of a tuner of this general type is described in the patent to R. E. Thompson, No. 2,811,045, issued October 29, 1957 and assigned to the assignee of the present invention.

In order to indicate the position of the cores 21, a lever arm mechanism is connected to the carriage 19. This includes an arm 91 (see FIG. 3) the front end of which moves across the front of the tuner background plate 87 to indicate the movement of the carriage from the front to the back of the tuner frame. Thus, an indication of the position of the cores 21 will be provided by the front of the arm 91. Tuning indicators of this type are well known in the art as taught by the patent to Sacre, No. 2,770,137, issued November 13, 1956, and by the patent to Lyon, Jr., No. 2,933,927, issued April 26, 1960. Both of these patents have been assigned to the assignee of the present invention.

As previously mentioned, the tuner shown in the drawings is for use with a combination AM–FM radio receiver. The operating state of the radio receiver, that is, the AM or FM mode of operation, is determined by means of a switch 35 located on one side of the tuner frame 36. Switch 35 includes a plurality of lugs 37 for connection to the radio receiver circuitry. A movable element 39 is linearly slidable to connect and disconnect respective ones of lugs 37. Element 39 is positioned by an irregularly shaped movable bracket 41 which is biased in one direction by means of a coil spring 43.

Figure 2:
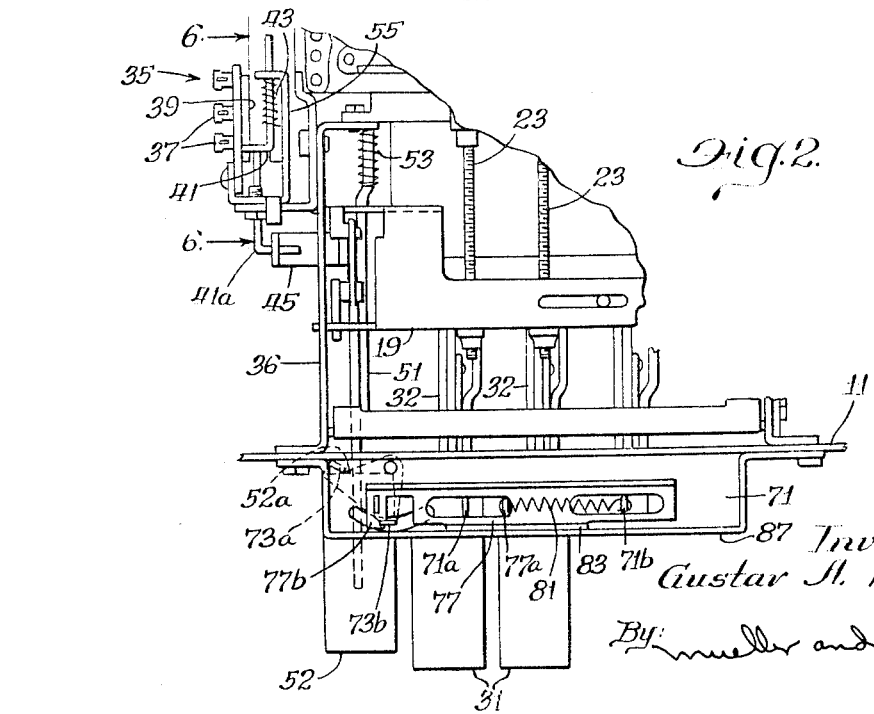
FIG. 2 is a partial top plan view of the apparatus of FIG. 1 with the indicator device in an alternative position.

An L-shaped extension 41a of bracket 41 extends through switch frame 55 and is engaged by an arm 45. Arm 45 extends upwardly from a slide 51, which is controlled by the pushbutton 52. Pushbutton 52 and its associated slide 51 are biased outwardly of the tuner by means of a coil spring 53. Pushbutton 52 and its associated slide 51 are in the furthest outward position in FIG. 1. In this position, the lugs 37 are so connected that the tuner operates in the AM mode. Depression and release of pushbutton 52 moves member 39 to change the connections of lugs 37. Thus, with pushbutton 52 in the inward position shown in FIG. 2, the condition of switch 35 is such that the receiver operates in the FM mode of reception.

Means are provided on the switch 35 for latching element 39 against the bias of spring 43 upon every other depression-release actuation of a pushbutton 52. The pushbutton 52 and its associated slide 51 are thereby made stable in the respective inward and outward positions. The construction and operation of this part of which 35 are illustrated in FIGS. 4 through 7, which are sectional views of the switch in respective steps of its operation. The frame 55 of the switch includes two flanges 57 and 58, extending therefrom. Flange 58 has an opening for guiding the end of bracket 41 and also provides a bias bearing surface for spring 43. Bracket 41 carries a pivotal dog 61 thereon. Pivotal dog 61 has V notches 61a and 61b at either end thereof and is freely pivotal on bracket 41. As may be seen from FIG. 4, dog 61 lies adjacent flange 57.

Depression of pushbutton 52 will move bracket 41 to the left until, as seen in FIG. 5, notch 61a of dog 61 engages flange 58. Because flange 58 extends downwardly a distance sufficient only to engage one tip of the V notch 61a in dog 61, the dog will pivot slightly, having cleared flange 57, to the position shown in FIG. 5. Upon release of the pushbutton 52, spring 43 and spring 53 will tend to return the pushbutton and slide to their original position. However, because of the slight pivoting of dog 61, the V notch 61b on the end of dog 61 will engage flange 57 and pivot the dog to the position shown in FIG. 6. Such a position is a static position because of the manner of engagement of the V notch 61b with the flange 57. Thus, pushbutton 52 will be prevented from returning to the outward position, but will be held in the inward position as may be seen in FIG. 2, which is the FM position. When pushbutton 52 is pressed once again, dog 61 will clear flange 57, engage flange 58, and pivot slightly to the position shown in FIG. 7. Release of pushbutton 52 will then cause the edge of dog 61 to engage flange 57, pivoting the dog around to the position shown in FIG. 4, only with notches 61a and 61b reversed. This permits the pushbutton 52 to return to its fully extended position, which is the AM position. Successive depressions of pushbutton 52 will therefore change the operating state or mode of the apparatus from AM to FM and back.

It is desirable that provision be made for a visual indication of the state to which the apparatus has been switched, i.e. FM mode or AM mode. Because it is desirable also to minimize size, cost and production time for the items, such indicator must be simple and utilize a minimum of space. Furthermore, where a large number of different types of tuner structures are manufactured, it is a decided cost advantage to make such tuners as similar as possible in all respects. Accordingly, the indicator mechanism should be designed so that it is adaptable to different types of radio models with as many standard parts as possible. All these are accomplished by the present invention.

The indicator of the present invention is activated by the inner surface of the pushbutton 52. The indicator is also disposed outwardly of the front panel 11 of the tuner, such that the construction of the apparatus behind the panel may be varied considerably without having to alter the construction of the indicating device. A support panel 71 extends outwardly from the front of panel 11 and supports integral background panel 87 which extends upwardly therefrom. A bell crank 73 is pivotally mounted on the underside of panel 71. Bell crank 73 has a downwardly extending portion 73a, which is engageable by the inner edge 52a of pushbutton 52. A curved slot 75 is provided in panel 71, and an upwardly extending finger 73b projects from bell crank 73 through the slot. A bracket 77 is supported by panel 71 and is slidable with respect thereto. A pair of longitudinal slots 79 are formed in bracket 77, and tabs 71a and 71b are formed in panel 71 and extend upwardly through slots 79 to guide the bracket. Bracket 77, has an upwardly extending tab 77a which is connected by means of a coil spring 81 to tab 71b. Spring 81 exerts a horizontal force and a downward force on bracket 77, biasing it to the right and holding it in place against panel 71. Bracket 77 has a right angle finger 77b projecting therefrom at one end and engaging portion 73b of bell crank 73. Due to spring 81, the bracket 77 is biased to the right and accordingly, portion 73a of bell crank 73 is biased against the inner edge 52a of pushbuton 52.

An integral indicator plate 83 extends upwardly from bracket 77 and has characters thereon for indicating the state to which the receiver is switched. The characters may be letters or merely some distinguishable mark. As may be seen in FIG. 3, in the embodiment shown the letters AM and FM are punched in the upwardly extending plate 83. An opening 85 is provided in background panel 87 and the characters (AM and FM) successively align themselves with this opening according to the position of plate 83 with respect to panel 87. This position, of course, will be determined by the movement of bracket 77 according to the positioning of pushbutton 52 as transmitted thereto through bell crank 73. Thus with pushbutton 52 in the position shown in FIG. 1, the AM characters will be aligned with opening 85, as shown in FIG. 3. Depression and release of pushbutton 52 to the FM position will move bell crank 73 in a clockwise rotation as viewed in FIGS. 1 and 2, forcing bracket 77 to the left and hence aligning the FM characters with opening 85. The characters in the slidable plate 83 may be piercings which are backed by red and green translucent vinyl tape. In such case the characters might be distinguishable by color only. A light bulb such as incandescent light 93 may be positioned behind panel 87 and panel 83 to illuminate the piercings for easier viewing.

It may therefore be seen that the invention provides a compact low cost device for indicating the operating state of an apparatus which is pushbutton controlled. The device is simple in construction and easily produced, and is particularly adaptable for use as an AM–FM indicator in a pushbutton tuned radio receiver.

What is claimed is:

1. An indicator for use in a device operable to two states by a pushbutton having first and second stable positions, one for each state, including in combination, a mask member having an opening therein, a slidable member disposed behind said opening in said mask member and having first and second characters thereon representing the two states to which the device is operable, said slidable member being movable to first and second positions to align said first and second characters respectively with said opening in said mask member so that they are visible, and a bell crank engageable by the pushbutton and pivotal to first and second positions according to the first and second positions of the pushbutton, said bell brank being coupled to said slidable member to move said slidable member between said first and second positions according to said first and second positions of said bell crank, whereby said indicator provides an indication of the operative state of the device.

2. An indicator for use in wave signal tuning apparatus having a plurality of tuning pushbuttons and a tuner indicator, including in combination, a background plate for the tuner indicator disposed adjacent the pushbuttons and having an opening therein, a slidable plate disposed behind said opening on said background plate and having first and second characters thereon representing first and second modes of reception of the wave signal tuning apparatus, said slidable plate being movable to first and second positions to align said first and second characters respectively with said opening in said background plate so that they are visible, a pushbutton disposed adjacent the tuning pushbuttons for switching the tuning apparatus between first and second modes of operation, said pushbutton having first and second stable positions for said first and second modes of operation respectively, a bell crank engageable by said pushbutton and movable to first and second positions according to said first and second positions of said pushbutton, and means coupling said bell crank to said slidable plate to move said slidable plate between said first and second positions according to said first and second positions of said bell crank, whereby said indicator provides an indication of the operative state of the device.

3. The combination of claim 2, wherein said bell crank pivots in a plane parallel to the movement of said pushbutton and perpendicular to said slidable plate, and wherein said means coupling said bell crank to said slidable plate comprise a spring biased slidable bracket extending from said slidable plate at substantially right angles thereto.

4. An AM–FM indicator for use in a radio receiver having a plurality of tuning pushbuttons and a tuning indicator, including in combination, a background plate for the tuning indicator disposed adjacent the pushbuttons in a plane perpendicular to the movement thereof and having an opening therein, a support plate disposed at the edge of said background plate adjacent to the pushbuttons and being perpendicular to said background plate, a slidable plate disposed behind said opening in said background plate and having first and second characters thereon representing AM and FM modes of reception, said slidable plate being movable to first and second positions to align said first and second characters respectively with said opening in said background plate so that they are visible, a pushbutton disposed adjacent the tuning pushbuttons for switching the receiver between AM and FM modes of operation, said pushbutton having first and second stable positions for AM and FM modes respectively, a bell crank pivotally mounted on said support plate to be pivotal in a plane parallel therewith, said bell crank having a portion thereon engageable by said pushbutton and being pivotal to first and second positions according to said first and second positions of said pushbutton, a curved slot in said support plate, said bell crank having a portion thereon extending upwardly through said slot, a plurality of tabs formed out of said support plate and extending upwardly therefrom, a slidable bracket extending from said slidable plate substantially perpendicularly thereto and having elongated slots therein, said bracket being disposed on said support plate with said tabs extending through said slots, and a coil spring having one end fixed to one of said tabs and having the other end fixed to said bracket, said coil spring exerting a downward force on said bracket for holding it in place and further exerting a horizontal force on said bracket to bias said bracket against said bell crank and said bell crank against said pushbutton, whereby said indicator provides an indication of the operative state of the device.

5. Means for controlling and indicating the mode of operation of wave signal receiver apparatus which is operable in two modes, including in combination, a switch connectable in the receiver to alter the mode of operation, said switch having a movable operating element, a pushbutton and means coupling the same to said operating element for operating said switch, said last named means including a latch for latching said operating element and said pushbutton in each of two stable positions upon successive depressions of said pushbutton, a plate having an opening therein, a slidable member disposed behind said opening in said plate and having first and second characters thereon representing the two modes in which the receiver is operable, a bell crank engageable by said pushbutton and pivotal to first and second positions according to respective ones of the two stable positions of the pushbutton, and means coupling said bell crank to said slidable member to move said slidable member according to said first and second positions of said bell crank to align said first and second characters respectively with said opening in said plate so that they are visible, whereby said indicator provides an indication of the operative state of the device.

6. Means for controlling and indicating the mode of operation of wave signal receiver apparatus which is operable in two modes, including in combination, a switch connectable in the receiver to alter the mode of operation, said switch having a movable operating element, a pushbutton and means coupling the same to said operating element for operating said switch, said last named means including a latch for latching said operating element and said pushbutton in each of two stable positions upon successive depressions of said pushbutton, a background plate having an opening therein, a slidable plate disposed behind said opening in said background plate and having first and second piercings therein representing the two modes in which the receiver is operable, translucent means of contrasting colors disposed behind respective ones of said piercings to provide an easily observable indication of the mode of operation, a bell crank engageable by said pushbutton and pivotal to first and second positions according to respective ones of the stable positions of the pushbutton, and means coupling said bell crank to said slidable member to move said slidable member according to said first and second positions of said bell crank to align said first and second piercings respectively with said opening in said plate so that they are visible, and lighting means disposed behind said slidable plate to illuminate said first and second piercings, whereby said indicator provides an indication of the operative state of the device.

References Cited by the Examiner
UNITED STATES PATENTS

| 2,356,935 | 8/1944 | Kach | 334—7 |
| 3,212,343 | 10/1965 | Clark | 74—110 |
| 3,216,275 | 11/1965 | O'Connell | 74—483 |

MILTON KAUFMAN, *Primary Examiner.*

JACK D. PUFFER, *Examiner.*